United States Patent [19]

Feist et al.

[11] Patent Number: 4,869,590
[45] Date of Patent: Sep. 26, 1989

[54] GEODETIC INSTRUMENT

[75] Inventors: Wieland Feist; Klaus Gürtler; Jost Schüler, all of Jena-Lobeda, German Democratic Rep.

[73] Assignee: Jenoptik Jena, GmbH, Jena, German Democratic Rep.

[21] Appl. No.: 850,317

[22] Filed: Apr. 10, 1986

[30] Foreign Application Priority Data

Jun. 3, 1985 [DD] German Democratic Rep. .................................. 2768938

[51] Int. Cl.$^4$ ............................................. G01C 1/10
[52] U.S. Cl. ................................... 356/148; 356/249; 356/252
[58] Field of Search ................. 33/283; 356/141, 148, 356/149, 152, 153, 249, 250, 252

[56] References Cited

U.S. PATENT DOCUMENTS

| | | | |
|---|---|---|---|
| 3,960,453 | 6/1976 | Svansson et al. | 356/252 |
| 4,119,379 | 10/1978 | Zindler | 356/152 |
| 4,136,955 | 1/1979 | Aeschlimann et al. | 356/149 |
| 4,348,109 | 9/1982 | Auterson | 356/252 |
| 4,671,165 | 6/1987 | Heidmann et al. | 356/252 |

Primary Examiner—Richard A. Rosenberger
Attorney, Agent, or Firm—Jordan and Hamburg

[57] ABSTRACT

The invention relates to a geodetic instrument with a telescope, an objective with a reticle in the focal plane, a clinometer and optoelectronic elements with the objective of avoiding faulty measurements due to a vibrating or oscillating target image, as well as of avoiding hanging or sticking of the pendulum and of achieving a higher measuring accuracy and of facilitating the reading of the pole. The invention is applicable particularly for compensator levels. Its task is to provide the fundamentals for an automated compensator level through the use of optoelectronic components and microprocessors and to carry out measurements on an oscillating substratum. This is accomplished owing to the fact that a luminous area or a light spot is controlled by a clinometer and located in its position by an optoelectronic receiver, and that an electric signal is generated, which triggers the display of a division mark, a pointer or its image in the image field of telescope objective, the straight line connecting the principal point of the objective and the display representing the position of the visual axis of the telescope.

17 Claims, 2 Drawing Sheets

U.S. Patent    Sep. 26, 1989    Sheet 1 of 2    4,869,590
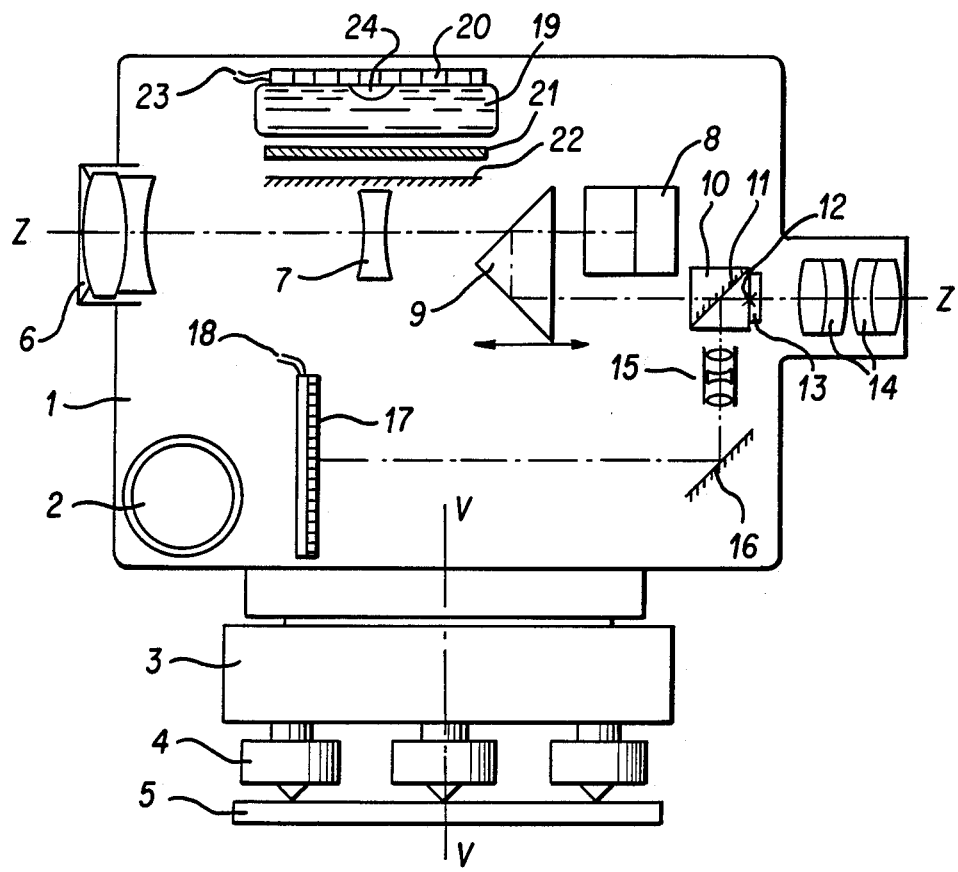
FIG. 1
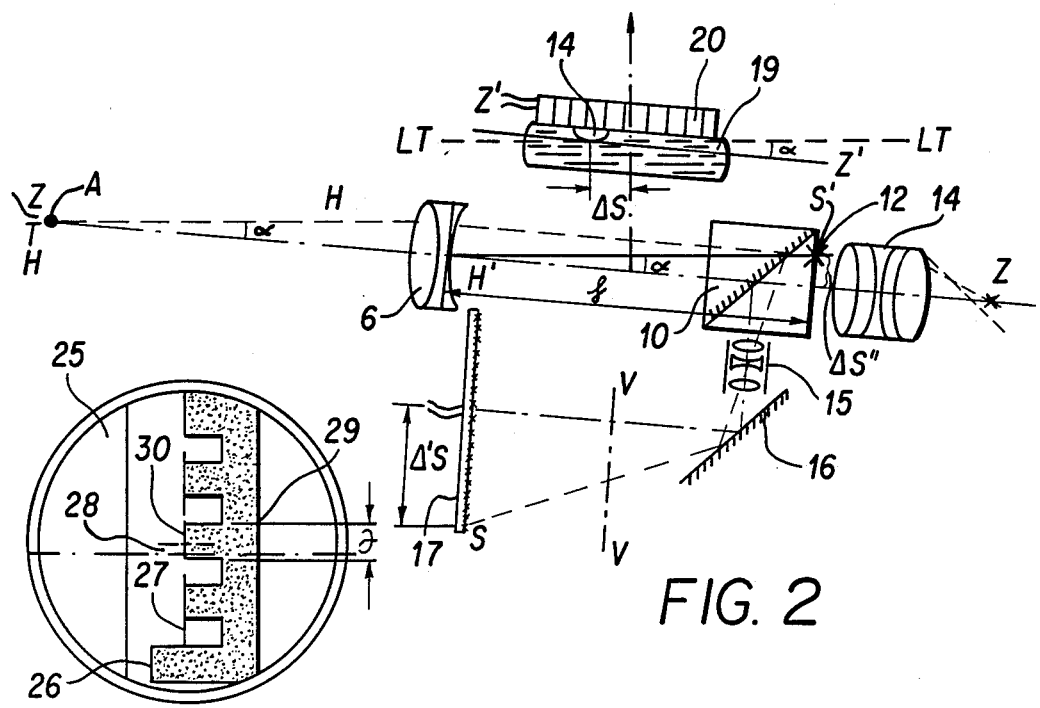
FIG. 2
FIG. 3

GEODETIC INSTRUMENT

BACKGROUND OF THE INVENTION

The invention relates to a geodetic instrument with a telescope, an objective with a reticle in the focal plane, a clinometer, with optoelectronic receivers and a light-transmitting or light-blocking array of optoelectronic elements.

The invention finds application in measuring systems for the gearless transfer of the measurement path and in geodetic instruments, especially for the compensator level of average and low accuracy for resolving the smallest measurement step.

A large number of compensator levels are known which, by the use of a mechanical pendulum, control either the target image relative to fixed cross hairs or the cross hairs relative to a fixed target image (F. Deumlich, Instrumentenkunde der Vermessungstechnik (Instrument Science of Surveying Techniques) VEB Verlag für Bauwesen, Berlin 1982). The compensator levels have the disadvantage that, in the event of vibrations of the tripod due to wind flow or earth tremors, the target image is caused to oscillate or vibrate, which makes it difficult to read the surveyor's pole. If separate compensation devices are used as in theodolites and tachymeters, errors in height measurements can arise owing to the fact the pointer of the vertical circle is imaged over the inclination compensator and the micrometer reading of the vertical circle is also made difficult by oscillations of the tripod. European Patent No. 046,647, discloses a digital measuring device for determining the path displacements. From the measured signals, this device derives the path displacement and converts it into digital signals.

SUMMARY OF THE INVENTION

The invention is intended to eliminate the disadvantages mentioned, to achieve a higher measuring accuracy, to facilitate reading the surveyor's pole and to avoid wrong measurements due to a vibrating or oscillating target image as well as due to hanging or sticking of the pendulum and to reduce the manufacturing costs by using simple components.

It is an object of the invention to provide the foundation for an automated compensator level through the use of optoelectronic components and microprocessors and, by eliminating the oscillating target image, to carry out measurements with a geodetic instruments even on a substratum that is oscillating.

In accordance with the invention, this object is accomplished by the provision of a device wherein a luminous area or light spot is controlled by a clinometer and located in its position by an optoelectronic receiver. An electric signal is generated, which triggers the display of a division mark, a pointer or its image in the image field of the telescope objective. The display being so disposed relative to the principal point of the objective, that the straight line connecting the principal point of the objective and the display represents the position of the visual axis of the telescope. If the clinometer represents a bubble level, it is advantageous to provide and adjust a light stop arrangement below the bubble level, so that only the bubble of the bubble level transmits light, which falls on the bubble from the side over a reflector and condenser arranged below the light stop, the field surrounding the bubble appearing to be dark. The bubble level is, moreover, preferably a level tube and the light stop a black rod. The bubble level is furthermore connected rigidly to the optoelectronic receiver and the bubble length is so matched to the receiver surface, that an optoelectronic receiver is associated with each end of the bubble of the bubble level and that these receivers are separated from one another by the light stop image. If the clinometer represents a liquid cell with an imaging system, a light spot is produced, which is controlled by the liquid as a function of the inclination of the cell to the vertical direction. If the clinometer represents a pendulum with an imaging element, which reflects a light spot generated by an instrument-fixed projector, the position of the image is fixed by an optoelectronic receiver. The optoelectronic receiver may be provided as a positionsensitive detector or as a CCD line arrangement. It is furthermore of advantage that a transparent punctiform or striated, radiant or light-blocking arrangement of electronic components is provided or mirrored into the image field of the telescope, said electronic components being constructed as a lattice array, in which the light-emitting components are luminescent or electroluminescent diodes and the light blocking components are liquid crystals, which are translucently illuminated with daylight or artificial light and, when a voltage is applied, transmit the light only linearly or pointwise. Moreover, it is advantageous if the pointer or the image of the pointer of a measuring instrument appears in the visual field of the telescope, said pointer being controlled analogously by the clinometer.

A novel, automated compensator level is provided by the invention. The telescopic image of said compensator level no longer vibrates or oscillates and sticking or hanging of the pendulums in their working range is avoided. As a result, more accurate measurements are obtained on the ground and on a vibrating substratum. Moreover, due to the use of microprocessors, the level instrument, after the pole is read, can at the same time calculate the height difference and record it.

BRIEF FIGURE DESCRIPTION

The invention will now be explained in greater detail with reference to the accompanying drawing, wherein:

FIG. 1 shows the inventive construction of an electronic compensator level.

FIG. 2 shows the functional diagram of the inclination compensation with a bubble level as clinometer.

FIG. 3 shows an image field section of a telescope.

DISCLOSURE OF PREFERRED EMBODIMENT

Figure 4:
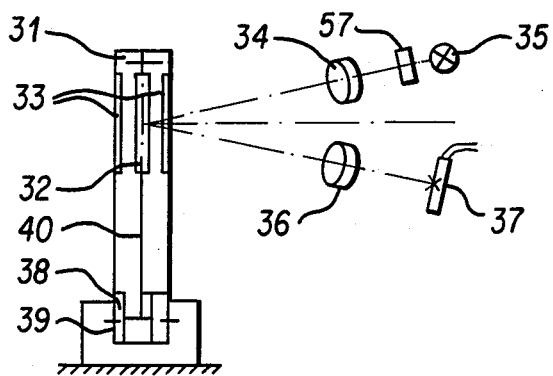
FIG. 4 shows the functional diagram of the inclination compensation with a pendulum as clinometer.

FIG. 1 shows an electronic compensator level, partially opened up so as to show the functional elements schematically. An upper part 1 of a compensator level contains a knob 2 for lateral fine adjustment, which rotates the upper part 1 relative to a stationary tripod 3 with foot screws 4 and a mounting plate 5. In the upper part 1, there is arranged a telescope with the visual axis ZZ, comprising an objective 6, a negative lens 7 and the prisms 8 and 9, prism 9 being movably disposed for focussing, a partial cube 10 with a partially metallized surface 11, a focal plane 12, a cover glass 13 and the eyepiece 14. Into the focal plane 12 are imaged a light-emitting electronic component arrangement 17 with the connections 18 over the partially metallized surface 11 and a microobjective 15 over a mirror 16. The component arrangement 17 receives the control signals from an electronic system, which is known as such and, for reason of greater clarity, has not been shown in FIG. 1, and which receives its control signals from an output 23 of a position-sensitive detector 20, which is rigidly arranged on a bubble level 19 (clinometer). The component system 17 can have light emitting elements at its edge of a color different than those at its center, with separate drives, to define boundary or special regions. Below the bubble level 19, a light stop arrangement 21 and a reflector 22 are so disposed, that light coming from the outside is reflected by the bubble level 19 in such a manner, that bubble 24 of the bubble level 19 lights up and the surrounding field of the bubble level liquid appears dark. The polished radius of the bubble level is not shown in FIG. 1. If the level bubble is very long, it is desirable to associate a separate optoelectronic receiver with each end of the bubble. The objective 6 and the negative lens 7 are shown in the conventional manner in the drawing plane, are fixed rigidly to the instrument and, together with the prisms 8 and 9, the partially metallized surface 11 and an eyepiece 14, form the telescope.

A functional diagram of the inclination compensation employing a bubble level as clinometer is shown in FIG. 2. The visual axis Z-Z of the electronic compensator level 1 is inclined to the horizontal H-H at an angle $\alpha$. Since the instrument cannot be prelevelled very accurately with the foot screws 4 (FIG. 1), the levelling must be corrected by a compensation device. For this reason, the angle $\alpha$ of the bubble level 19 is measured by means of the position-sensitive detector 20. In so doing, the bubble of the bubble level migrates over a distance $\Delta S$ and the bubble level tangent LT-LT lies on the horizon H-H and forms the angle $\alpha$ with the line Z'-Z' parallel to the visual axis. The displacement $\Delta S$ gives the angle of inclination and is measured in units of bubble level divisions (for example, 2 mm=30" for a 30" bubble level). The displacement $\Delta S$ is converted either by the position-sensitive detector 20 into an analog signal or by a CCD line arrangement into a digital signal and determines, the distance $\Delta S'$ of a light emitting diode line S in the 17 that lights up from the center of this array. The micrometer objective 15 then images $\Delta S'$ on a reduced scale in the focal plane, the size of the image being $\Delta S''$, with $\Delta S'' = \Delta S'/M$   M = microscope magnification The displacement $\Delta S''$ is positioned at the focal length f of the objective with the angle $\alpha$ and thus indicates the horizon S', which the bubble of the bubble level simulates in the visual field of the telescope. The straight line connecting the principal point H of the objective 6 and the illuminated line image S' of the light emitting diode line S is the horizontal line of collimation H'S' of the telescope. The horizon H-H is parallel to this horizontal line of collimation H'S' and intersects the visual axis Z-Z in the front focal point A of the objective 6. If the negative lens 7 is introduced into the path of the light rays, point A can be arranged behind the objective 6 and thus closer to the vertical axis V-V (not shown for the sake of greater clarity). With the eyepiece 14 and with the help of the illuminated line image S', an observer reads on the surveyor's pole the display of the horizontal line of collimation H'S' (FIG. 3).

FIG. 3 shows the pole image 26 appearing in a visual field 25 of the telescope. With a vertical line 27, an observer aims for the edge of a division 29. The line 29 represents a measuring division of a surveyor's rod, known per se. From the image 28 of the illuminated line S', the observer can estimate in the 1 cm interval 27, for example, the remainder 30 (in tenths of the interval 27), that is, in millimeters. The grid of the illuminated line array 17, that is, the line spacing proportional to the microscope magnification M, is then matched to this estimated millimeter value.

The functional diagram of the inclination compensation with a pendulum as a clinometer is shown in FIG. 4. A mechanical pendulum 40 with an imaging element, for example a mirror 32 and the windows 33, is suspended in a frame 31. A luminous beam of a collimator 34 with a lamp 35, in front of which a measuring mark 57 is arranged in the path of the rays of the collimator 34, falls through these windows 33. The luminous beam of the collimator 34 is reflected by the mirror 32 and the reflected luminous beam then reaches the objective 36, which images the measuring mark 57 on an optoelectronic receiver 37. At the same time, the pendulum 40 is damped by an air damper 38 and the functional range of the pendulum 40 is limited by the stops 39. If the base with the frame 31 is inclined, this inclination is recorded by the migration of the image of the measuring mark 57 at the optoelectronic receiver 37 and converted into an analog signal, which serves to control the display 17.

Figure 5:
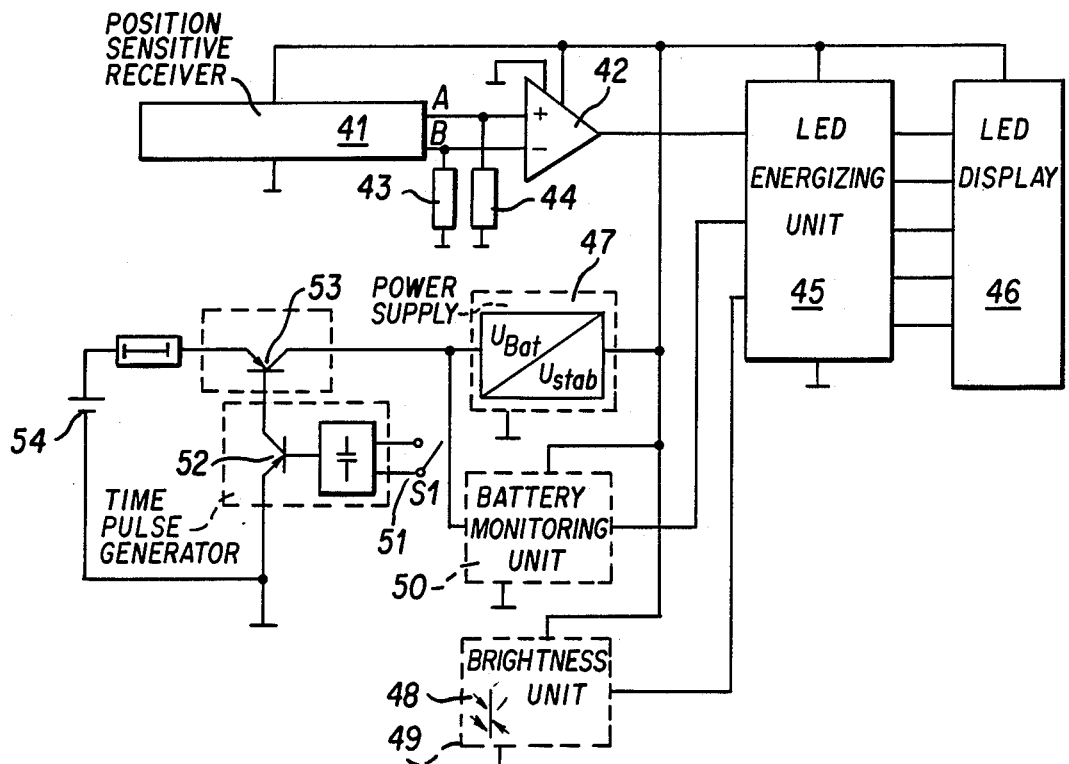
FIG. 5 shows the block circuit diagram with a display array.

The block circuit diagram of an electronic compensator level is shown in FIG. 5. A position-sensitive receiver 41 serves to receive the measured values. It receives a stabilized battery voltage, which is generated in a power supply unit 47. The two output voltages $U_A$ and $U_B$ of the receiver 41 are processed by means of a difference amplifier 42, in order to compensate for brightness and illumination fluctuations and fluctuations in the sensitivities on the receiver surface 41. The output voltage of the difference amplifier 42 serves as a control voltage for an LED energizing unit 45. This LED energizing unit 45 drives an LED display unit 46 in such a manner, that only one LED is energized, which is equivalent to the illuminated position of the receiver 41. Moreover, a display element may also comprise a series circuit of several light-emitting elements. Furthermore, the possibility exists of matching the brightness of the display element 46 by means of the energizing unit 45 to the surrounding light by means of a receiver element 48, for example, photodiodes in a brightness unit 49. A battery monitoring unit 50 realizes the battery undervoltage through the display elements 46. The measuring process is initiated by a key 51. This then starts the time pulse generator 52, with which the device as a whole is supplied over an electronic switch 53 with the voltage of a battery 54 and switched off again after a certain time, which is determined by the time pulse generator 52.

Figure 6:
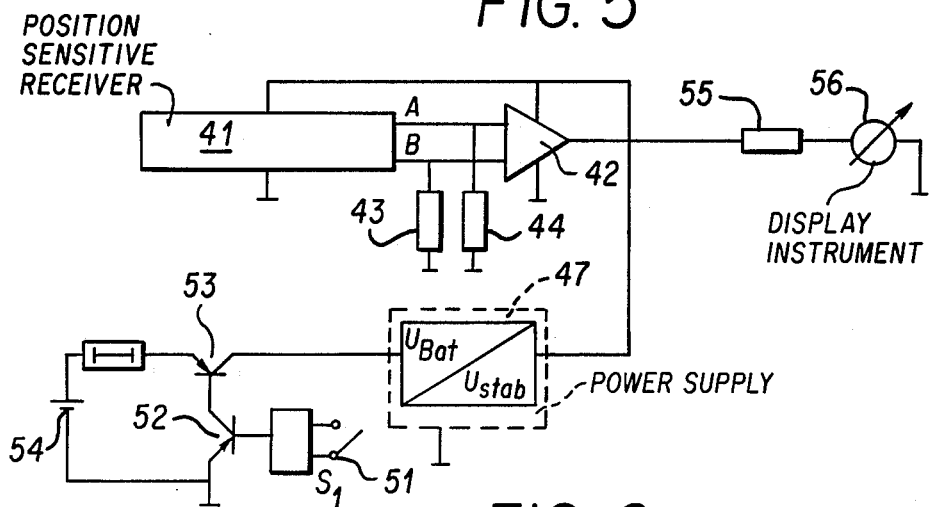
FIG. 6 shows the block circuit diagram with an analog display.

FIG. 6 shows the block circuit diagram for an analog display, in which the display is replaced by a display instrument 56 and the voltage of the difference amplifier 42 is displayed directly over a resistance 55 in the display instrument 56. The other components, such as the battery monitoring unit 50 and the brightness control unit 49, can be omitted.

The display instruments described in FIG. 5 may also represent liquid crystal displays or electroluminescent structures, which require special energizing units.

We claim:

1. In a geodetic leveling instrument comprising means for rotating said instrument substantially solely about a vertical axis for aiming said instrument at a surveyor's rod located at a target point, the surveyor's rod having graduation interval markings, the improvement wherein said instrument further comprises:

a telescope having a focal plane, an objective lens with a principal point and an image field, and a reticle pattern in the focal plane of the telescope;

an inclinometer comprising an optoelectronic receiver for providing an output dependent upon the inclination of said instrument;

a light-emitting or blocking array of optoelectronic elements connected to receive said output of said optoelectronic receiving arrangement;

means for imaging the optical output of said array to produce a luminous surface or luminous mark in the focal plane of said telescope objective, whereby the position of said surface or mark is responsive to the output of said optoelectronic receiver of said inclinometer and corresponds to the output of at least one of the optoelectronic elements of the light emitting or blocking array;

means for arranging said luminous mark or the image thereof to light up in the image field of said telescope objective and to be aligned with respect to the principal point of the objective lens so that a line connecting said principal point of the lens and said luminous mark or its image at said focal plane defines a horizontal axis of the telescope, said light emitting or blocking array having individual optoelectronic elements spaced apart a distance to permit viewing graduation interval markings of the surveyor's rod in the image field of said telescope objective with a resolution of at least one tenth of the graduation interval of the surveyor's rod.

2. Geodetic leveling instrument as defined in claim 1, wherein the signal generated by the optoelectronic receiver produces a horizontal division mark in the image field of the telescope objective.

3. Geodetic leveling instrument as defined in claim 1, wherein said inclinometer comprises a bubble level, comprising a light stop arrangement positioned below said bubble level so that only the bubble of the bubble level transmits light, which falls on the bubble via a reflector and condenser arranged below the light stop, whereby the field surrounding the bubble remains dark.

4. Geodetic leveling instrument as defined in claim 3, wherein the bubble level is a level tube and the light stop is a black rod.

5. Geodetic leveling instrument as defined in claim 3, wherein the bubble level is rigidly connected to the optoelectronic receiver and the length of the bubble of the bubble level is matched to the receiver surface, so that an optoelectronic receiver is allocated to each bubble end of the bubble level, the receivers being separated from one another by the image of the light stop.

6. Geodetic leveling instrument as defined in claim 1, wherein the inclinometer comprises a liquid cell with an imaging system, said liquid cell producing a light spot controlled by the liquid as a function of the inclination of the cell to the vertical direction.

7. Geodetic leveling instrument as defined in claim 1, wherein said inclinometer comprises a pendulum with an imaging element which reflects a light spot generated by a projector mounted on the instrument, the position of whose image is detected by said optoelectronic reeiver.

8. Geodetic leveling instrument as defined in claim 1, wherein said receiver comprises a position-sensitive detector.

9. Geodetic leveling instrument as defined in claim 1, wherein said optoelectronic elements comprise an electronic component arrangement which emits light or blocks transmitted light whereby said light area image is mirrored in or into respectively the image field of the telescope.

10. Geodetic leveling instrument as defined in claim 9, wherein the electronic component arrangement comprises a lattice-shaped array.

11. Geodetic leveling instrument as defined in claim 10, wherein a luminescent or electroluminescent diode is provided as a light-emitting component of the array.

12. Geodetic leveling instrument as defined in claim 11, wherein light-emitting components arranged at the edge of the array emit light that is of a different color than the light emitted by components arranged in the center of the array, a separate drive being provided for said components at the edge, in order to make boundary or special regions.

13. Geodetic leveling instrument as defined in claim 10, wherein liquid crystals are provided as light-blocking components of the array, said liquid crystals, when illuminated with light and with a voltage applied, transmitting the light only linearly, columnwise or pointwise.

14. Geodetic leveling instrument as defined in claim 1, wherein the optoelectronic elements comprise a pointer of a measuring instrument controlled analogously by the inclinometer arranged or having its image is mirrored in or into respectively the image field of the telescope.

15. Geodetic leveling instrument as defined in claim 1, wherein said receiver comprises a CCD line arrangement.

16. In geodetic leveling apparatus having a telescope rotatable substantially solely about a vertical axis and having an objective with an image field and a pattern of marks in its image field, an inclinometer with optoelectronic receivers, the improvement comprising a light-emitting or blocking array of optoelectronic elements, means responsive to the position of the inclinometer to produce an electric signal for causing a luminous area or luminous mark of said optoelectronic elements to luminesce, means for imaging said luminous area or mark in the image field of the telescope objective, said imaging means producing a pointer or its image on the image field having a position related to the center of the objective, whereby a straight line connecting the center of the objective and the luminous mark on the image field represents the horizontal of the sighting axis of the telescope.

17. The geodetic apparatus of claim 16 wherein the means responsive to the position of the inclinometer is arranged to produce a horizontal division line in the image field of the telescope objective to luminesce.

* * * * *